July 31, 1956
J. B. SEED ET AL
2,756,668
METHOD OF TREATING A SLURRY
Filed Feb. 27, 1953
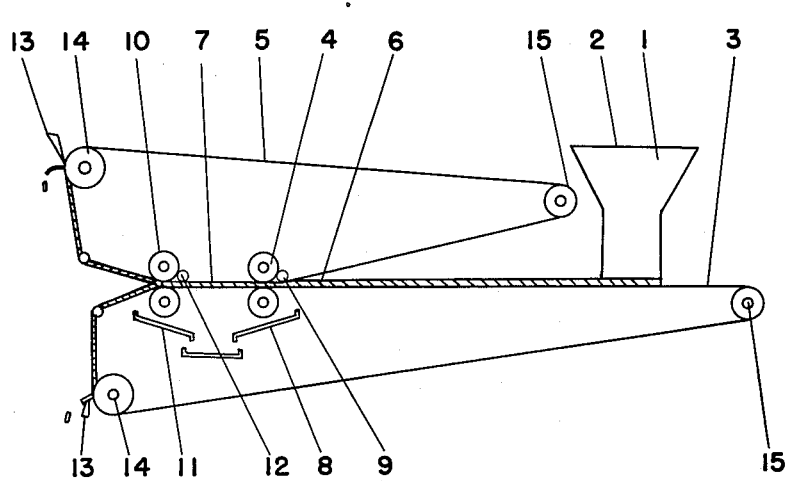
INVENTOR
JOHN BRYAN SEED
ARTHUR GORDON WALDIE
Cushman, Darby & Cushman
ATTORNEYS

2,756,668

METHOD OF TREATING A SLURRY

John B. Seed, Dumfries, and Arthur G. Waldie, Hawick, Scotland, assignors to Imperial Chemical Industries Limited, a corporation of Great Britain Application February 27, 1953, Serial No. 339,227

Claims priority, application Great Britain May 9, 1952

2 Claims. (Cl. 100—37)

The present invention relates to a method of treating a slurry particularly a slurry of insoluble meal which remains after protein is extracted from protein-containing materials of the kind such as de-oiled groundnut or soya meal.

On the extraction of protein from protein-containing material of the aforesaid kind, it is essential to separate the insoluble meal, which is separated in the form of a slurry, as for example by screening on a rotary filter from the protein solution which is formed when said protein-containing material is treated with dilute alkali to produce a solution having for instance a hydrogen ion concentration of pH 7 to 12.5. The said slurry may contain up to 90% water or 90% of a dilute aqueous solution of protein, and the usual value is in the region of 88%.

For the insoluble meal to be a saleable product it is essential to convert the said slurry into a substantially dry product, and this can be accomplished by evaporation of the water in, for instance, rotary driers of large capacity by contacting the slurry with flue gases from burning fuel.

The object of the present invention is to provide a process for the drying of the aforesaid slurries of insoluble meal which permits the greater part of the water to be mechanically removed prior to subjecting the insoluble meal to drying by heat, and which also permits a separation from the insoluble meal of any residual protein in the form of an aqueous solution thereof. Such a process permits economy in fuel consumption and the use of any recovered protein solution in further protein extraction operations.

According to the present invention the process of treating a slurry of insoluble meal which remains after protein is extracted from protein-containing material of the kind such as de-oiled groundnut and soya meal comprises feeding said slurry between moving endless belts of water-permeable material and expressing in at least one stage a substantial quantity of the aqueous portion of said slurry prior to subjecting the insoluble meal to a heat-drying operation.

The said endless belts can pass between at least one pair of nip rollers and may be for example of rough cloth, of woven fabric material, or of woven material supported by a metallic wire gauze or of wire gauze having a mesh for example of the order of 72 to 80 per inch. If desired furthermore the slurry can be fed between moving endless belts of different material.

Preferably the aqueous liquid thus expressed is collected and used for further extraction of protein from protein-containing material.

The slurry on being subjected to pressure between the water-permeable endless belts is converted into a thin sheet, and it may be necessary to remove at least a portion of this sheet from the endless belts by for example shaking or blowing, or by employing a doctor knife or scraper for each belt.

Improved results are often obtained by altering the pH value of a wet slurry to values less than 7 as it is found that the expression of the liquor and the removal of the thin sheet are facilitated.

A slurry having a water content of between seven and nine times the weight of the solid component can be converted in the above manner into a powdery product containing between 1.7 and 3 parts by weight of water for every one part of insoluble meal.

The invention is illustrated by the following example in which the parts are by weight and with reference to the diagrammatic drawing accompanying the specification.

Example

A slurry 1 of insoluble meal containing 8 parts of water, obtained after screening on a rotary filter a protein solution in dilute alkali obtained by the treatment of de-oiled groundnut meal, is introduced into a feedbox 2. The feedbox 2 continuously and evenly feeds the slurry onto an endless belt 3 consisting of woven fabric material and moving at a speed of 30 feet per minute. As the belt 3 enters the nip of a pair of rollers 4, it meets another endless belt 5 of similar material moving at the same speed. The layer of slurry 6 is converted into a sheet of wet insoluble meal 7. The expressed liquor passes through the endless belts 3 and 5 and is collected in the tray 8 and the vacuum tube 9. The pair of endless belts 3 and 5 between which the sheet of wet insoluble meal is sandwiched then pass through the nip of a second pair of rollers 10 where a further quantity of aqueous medium is squeezed out and collected in the tray 11 and the vacuum tube 12. The thus compressed sheet of insoluble meal as it leaves the second pair of rollers contains for every one part of insoluble meal between 1.7 and 3 parts of water and is easily removed from the endless belts 3 and 5 by means of doctor knives 13, which are spring loaded, onto rollers 14. 15 are guide rollers which are spring loaded to maintain tension in the endless belts 3 and 5. The vacuum tubes 9 and 12 are provided for the purpose of removing the small accumulation of water which forms at the incoming side between the belts 3 and 5 and the pairs of rollers 4 and 10.

The collected wet solid of insoluble meal may then be dried in known manner.

What we claim is:

1. In a process for the production of dry, water-insoluble meal from an aqueous slurry of insoluble meal obtained by de-oiling a protein-containing material selected from the group consisting of groundnut and soya and thereafter extracting protein therefrom by treatment with aqueous alkali, the steps comprising reducing the pH of said slurry to a value below pH 7, mechanically reducing the water content of said slurry by feeding the slurry between pressing means of water permeable material, applying pressure to said means in at least one stage to express a substantial portion of the aqueous content of said slurry through said water permeable means and thereafter subjecting the resulting product of insoluble meal of reduced water content to a heat drying operation.

2. A process for the production of a dry, water insoluble meal from an aqueous slurry of insoluble meal comprising the steps of de-oiling a protein-containing material selected from the group consisting of groundnut and soya, extracting protein therefrom by treatment with aqueous alkali, mechanically reducing the water content of said slurry to approximately three parts of water per part of insoluble meal by feeding the slurry between pressing means of water permeable material, applying pressure to said means in at least one stage to express a substantial portion of the aqueous content of said slurry through said water permeable means and thereafter subjecting the resulting product of insoluble meal of reduced water content to a heat drying operation.

References Cited in the file of this patent

UNITED STATES PATENTS

| | | |
|---|---|---|
| 248,083 | Boomer | Oct. 11, 1881 |
| 249,852 | Mercier | Nov. 22, 1881 |
| 348,019 | Jones | Aug. 24, 1886 |
| 520,242 | Overton | May 22, 1894 |
| 780,033 | Hachmann | Jan. 17, 1905 |
| 2,415,426 | Henning | Feb. 11, 1947 |
| 2,479,481 | Eberl et al. | Aug. 16, 1949 |
| 2,566,943 | King | Sept. 4, 1951 |

OTHER REFERENCES

Curtis and Clark: "An Introduction to Plant Physiology," first edition (1950), published by the McGraw-Hill Book Co., New York; 752 pages; pages 134 and 135 especially cited.